3,257,216
PROCESS FOR EFFECTING WATER REPELLENCY
Edwin B. Michaels and Clayton A. Wetmore, Norwalk,
Conn., assignors to Stamford Chemical Industries,
Inc., Cincinnati, Ohio, a corporation of Ohio
No Drawing. Original application Oct. 4, 1962, Ser. No.
228,248. Divided and this application Aug. 26, 1965,
Ser. No. 482,912
14 Claims. (Cl. 106—2)

This application is a division of our copending application for Letters Patent, Serial No. 228,248, filed on October 4, 1962, now U.S. Patent No. 3,214,451.

This invention relates to novel compounds and to methods for their preparation. More particularly, it relates to organic aluminum compounds hereinafter defined and has for its object the utilization of such compounds in compositions which impart water repellency to fibers, filaments, yarns and fabrics of the natural and synthetic types.

It is known that an aluminum alcoholate such as aluminum ethylate, can be reacted with one or two mols of a higher aliphatic monocarboxylic acid, such as stearic acid, to form a condensation product with the elimination of alcohol. Such condensation product can be utilized in naphtha, paraffin wax water-repellent compositions. Unfortunately, when the latter condensation compound is so employed, water repellency of a garment is not long lasting. Apparently, such condensation compound is not stabilized against water and behaves as a gelling agent in most organic solvents.

It has been found that the aforementioned difficulties of the prior art can be overcome by providing and utilizing a particular class of aluminum compounds which may be represented by the general formula:

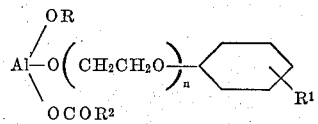

where R is a lower alkyl group containing from 2 to 6 carbon atoms, $R^1$ is an alkyl radical containing from 6 to 18 carbon atoms, $n$ is an integer from 0 to 6, and $R^2$ is an aliphatic radical containing from 9 to 17 carbon atoms.

In general, the aluminum alcoholates of the present invention are prepared by reacting substantially equimolar proportions of an aluminum trialcoholate with either an alkyl substituted phenol or an alkyl substituted phenol condensed with from one to six mols of ethylene oxide for a time sufficient to remove one mol of the alcohol from the aluminum alcoholate reactant. One mol of this reaction product, an aluminum dialcoholate, is then reacted with one mol of an appropriate aliphatic carboxylic acid, whereby a second mol of the alcohol is removed from the aluminum reaction product. The order of reaction is not critical. Thus, the aliphatic carboxylic acid can be employed to react initially with the aluminum trialcoholate, if desired.

Advantageously, a large variety of aluminum trialcoholates is contemplated. Among the trialcoholates are: aluminum ethylate, aluminum propylate, aluminum isopropylate, aluminum butylate, aluminum isobutylate, aluminum amylate, aluminum heylate and mixtures of the same.

Illustrative alkyl phenols and alkyl phenol-ethylene oxide condensates which can react with the aluminum alcoholates are: o-hexyl phenol, p-octyl phenol, o-nonyl phenol, p-nonyl phenol, dodecyl phenol, tridecyl phenol, stearyl phenol, and the ethylene oxide condensates thereof, prepared by reacting from one to six mols of ethylene oxide per mol of the above phenol.

As the aliphatic monocarboxylic acid there can be employed illustratively: decanoic acid, undecanoic acid, lauric acid, tridecanoic acid, myristic acid, stearic acid, oleic acid and linoleic acid.

The overall reaction can be conveniently carried out in the presence of an inert organic solvent, such as for instance perchloroethylene or petroleum ether. Further, the temperature of reaction can widely vary ranging between about 90° C. to about 160° C. and, preferably, between about 110° C. and about 150° C.

Typical illustrative and non-limiting preparations of the aluminum alcoholate reaction are presented below. The parts given are by weight, unless otherwise specified.

EXAMPLE 1

To a suitable reaction vessel equipped with stirrer, thermometer and condenser are added 204 parts of aluminum isopropylate (1 mol) and 206 parts of p-tert-octyl phenol (1 mol) in 574 parts of petroleum ether solvent. The mixture is heated to a temperature of about 130° C. Heating is continued until (60 parts) of isopropanol (1 mol) is collected. Therefore, 284.5 parts of stearic acid (1 mol) is slowly added while agitating and maintaining the reaction temperature at about 130° C. When 60 parts of additional isopropanol is removed and collected from the reaction mixture, the reaction is terminated and the product recovered as an oily, viscous liquid. Upon evaporation of the petroleum ether solvent, there is obtained, 574.5 parts of aluminum isopropylate stearate p-tert-octyl phenoxide, a soft waxy, transparent, substantially colorless solid, soluble in naphtha and petroleum ether.

EXAMPLE 2

The procedure of Example 1 is repeated in every detail except that aluminum ethylate is employed in place of aluminum isopropylate. During reaction a total of two mols of ethanol is collected. A good yield (560.5 parts) of aluminum ethylate stearate p-tert-octyl phenoxide is obtained.

EXAMPLE 3

Repeating in every detail Example 1 above except that a condensate of p-tert-octyl phenol and 1.5 mols of ethylene oxide is employed in place of the p-tert-octyl phenol reactant. The corresponding p-tert-octyl phenol-ethylene oxide condensate of aluminum isopropylate stearate is obtained in good yield. This product is a waxy soft, amorphous, light brown, transparent solid, soluble in toluene or petroleum ether.

EXAMPLE 4

Repeating Example 1 in every detail except that p-nonyl phenol is substituted for the p-tert-octyl phenol reactant. Resultant product, upon evaporation, is aluminum isopropylate stearate p-nonyl phenoxide, a soft, waxy, transparent yellow solid. It is soluble in petroleum ether, benzene or naphtha.

EXAMPLE 5

The procedure of Example 1 is repeated in every detail except that oleic acid is substituted for stearic acid. Resultant aluminum isopropylate oleate p-tert-octyl phenoxide is obtained in good yield upon evaporation of the petroleum ether solvent. The product is a pale amber, soft, waxy, transparent solid, soluble in petroleum ether or naphtha.

EXAMPLE 6

Substituting lauric acid for oleic acid in Example 5 above, there results aluminum isopropylate laurate p- tert-octyl phenoxide, a soft, waxy, transparent, light yellow solid, soluble in perchloroethylene and naphtha.

EXAMPLE 7

Repeating Example 5 in every detail except that decanoic acid is substituted for oleic acid, there is obtained aluminum isopropylate decanate p-tert-octyl phenoxide, a soft, waxy, substantially colorless solid.

EXAMPLE 8

The procedure of Example 3 is repeated in every detail except that three mols of ethylene oxide is substituted for the 1.5 mols of ethylene oxide therein employed. Resultant product, p-tert-octyl phenol-ethylene oxide condensate of aluminum isopropylate stearate, is a soft, waxy, amorphous, brownish, transparent solid, soluble in naphtha, toluene and petroleum ether.

Advantageously, the compounds of the invention can be utilized in a water repellent composition having markedly improved properties. Each of the compounds prepared in Examples 1–8 can be solublized by dissolving, for instance, 1 to 10 parts of the same in 1,000 parts of naphtha or any other solvent. A suitable wax, such as paraffin or beeswax, in an amount equal to 5 to 25 parts by weight and from 1 to 5 parts by weight of a wax compatible hardening resin such as limed rosin, polymerized terpene resin or polymerized petroleum resin, are added to the solvent solution. However, the composition may be prepared by any order of addition of the components thereof.

The water-repellent compositions can be applied to a fabric by any presently known method as, for instance, by dipping, roll coating and the like. Pick up on the fabric from about 1% to about 15% by weight of the hydroxylated aluminum compounds of the invention, based on the weight of the fabric, is usually sufficient to coat or impregnate the fabric. Upon exposure to a heated atmosphere at temperatures ranging from about 30° F. to about 180° F., the treated fabric is freed from solvent. Advantageously, the fabric remains water repellent after repeated wear and exposure to normal rainfall. In addition, the fabric can be rendered water-repellent even though it has been previously laundered or drycleaned.

To further illustrate the efficacy of the compounds of the invention, the following examples are presented.

EXAMPLES 9–18

Three typical fabrics are subjected to treatment to affect their water repellency. Designated as No. 1 is a new unlaundered 6 oz. cotton twill fabric. Designated as No. 2 is a 6 oz. cotton twill fabric which had been drycleaned employing 4% detergent charged naphtha solvent. In the summary tabularized below, these fabrics are treated with a variety of compositions.

The method employed in applying the water repellent compositions to fabrics involves the use of seven inch square swatches immersed in an appropriate treating bath. Each swatch is then removed from the solution bath and placed in a basket centrifuge. Exraction occurs and is terminated when the swatch increases to about one-third of its original weight. Extracted fabric is next dried in a circulating air-oven maintained at about 130° F. or hgher. The test squares are ironed and tested by subjecting them for sixty second to standard spray tests of the American Association of Textile Chemists and Colorists (AATCC).

Referred to in the table herein below is a control solution whose composition is as follows:

| Component: | Parts |
|---|---|
| Perchloroethylene (by vol.) | 1000 |
| Paraffin wax (M.P.=65° C.) | 20 |
| Terpene Resin (M.P.=115° C.) | 12 |

A variety of commercial available equivalents for each of the above components can be used with equal advantage.

Table 1

| Ex. | Type of Treatment | Spray Ratings on Designated Fabrics | |
|---|---|---|---|
| | | No. 1 | No. 2 |
| 9 | Fabric untreated | 0 | 0 |
| 10 | Fabric treated with control composition | 70 | 50 |
| 11 | Fabric treated with control composition containing 1.5% of the product of Example 1. | 100 | 100 |
| 12 | Fabric treated with control composition containing 2% of the product of Example 2. | 100 | 100 |
| 13 | Same as 11 employing product of Example 4. | 100 | 100 |
| 14 | Fabric treated with control composition containing 2% of the compound prepared by Example 4. | 100 | 100 |
| 15 | Fabric treated with control composition containing 2% of the compounds prepared by Example 5. | 100 | 100 |
| 16 | Same as 14 except that 2% of the composition prepared by Example 6 is employed. | 100 | 90 |
| 17 | Fabric treated with control composition containing 2% of the compound prepared by Example 7. | 100 | 90 |
| 18 | Fabric treated with control composition containing 1% of the composition prepared by Example 8. | 100 | 90 |

In Examples 11 to 18 the AATCC spray ratings are substantially higher than the ratings for the treated fabric of Example 10. The higher the AATCC rating the more effective the treatment.

We claim:
1. In a process for rendering matter in the form of a fiber, filament, yarn and fabric water repellent by treating the same with a novel aluminum compound, the improvement which comprises the steps of: applying to said matter a water repellent composition containing a mixture essentially of:
 (a) from 1 to 10 parts by weight of an aluminum compound in about 1000 parts by volume of a compatible organic solvent, said aluminum compound having the general formula:

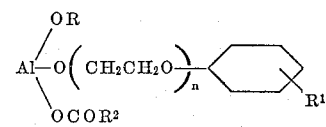

where R is a lower alkyl radical containing from 2 to 6 carbon atoms, $R^1$ is an alkyl radical containing from 6 to 18 carbon atoms and $R^2$ is an aliphatic hydrocarbon radical containing from 9 to 17 carbon atoms,
 (b) from 5 to 25 parts by weight of a wax-like substance selected from the group consisting of paraffin and beeswax, and
 (c) from 1 to 15 parts by weight of a compatible wax-hardening resin selected from the group consisting of limed rosin, pentaerythritol abietate, polymerized terpene resin and polymerized petroleum resin, and thereafter drying the matter so treated whereby from about 1% to about 15% of said aluminum compound adheres thereto.

2. The process according to claim 1 in which the material treated is a fabric.

3. The process according to claim 1 in which the material treated is a dry-cleaned fabric.

4. The process according to claim 1 in which the R, $R^1$, $R^2$ and $n$ of the aluminum compound are propyl, octyl, pentadecyl and zero, respectively.

5. The process according to claim 1 in which the R, $R^1$, $R^2$ and $n$ of the aluminum compound are ethyl, octyl, pentadecyl and zero, respectively.

6. The process according to claim 1 in which the R, $R^1$, $R^2$ and $n$ of the aluminum compound are propyl, octyl, pentadecyl and 1.5, respectively.

7. The process according to claim 1 in which the R, $R^1$, $R^2$ and $n$ of the aluminum compound are propyl, nonyl, pentadecyl and zero, respectively.

8. The process according to claim 1 in which the R, $R^1$, $R^2$ and $n$ of the aluminum compound are propyl, octyl, heptadecyl and zero, respectively.

9. A composition adapted for rendering matter in the form of a fiber, filament, yarn and fabric water repellent comprising a mixture of:

(a) from 1 to 10 parts by weight of an aluminum compound in about 1,000 parts by volume of a compatible organic solvent, said aluminum compound having the general formula:

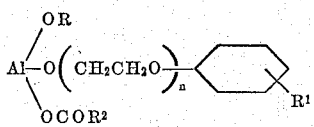

where R is a lower alkyl radical containing from 2 to 6 carbon atoms, $R^1$ is an alkyl radical containing from 6 to 18 carbon atoms and $R^2$ is an aliphatic hydrocarbon radical containing from 9 to 17 carbon atoms, (b) from 5 to 25 parts by weight of a wax-like substance selected from the group consisting of paraffin and beeswax, and (c) from 1 to 15 parts by weight of a compatible wax-hardening resin selected from the group consisting of limed rosin, pentaerythritol abietate, polymerized terpene resin and polymerized petroleum resin.

10. The composition of claim 9 wherein the R, $R^1$ and $R^2$ and $n$ of the aluminum compound are propyl, octyl, pentadecyl and zero, respectively.

11. The composition of claim 9 wherein the R, $R^1$, $R^2$ and $n$ of the aluminum compound are ethyl, octyl, pentadecyl and zero, respectively.

12. The composition of claim 9 wherein the R, $R^1$, $R^2$ and $n$ of the aluminum compound are propyl, octyl, pentadecyl and 1.5, respectively.

13. The composition of claim 9 wherein the R, $R^1$, $R^2$ and $n$ of the aluminum compound are propyl, nonyl, pentadecyl and zero, respectively.

14. The composition of claim 9 wherein the R, $R^1$, $R^2$ and $n$ of the aluminum compound are propyl, octyl, heptadecyl and zero, respectively.

References Cited by the Examiner

UNITED STATES PATENTS

| | | | |
|---|---|---|---|
| 2,801,190 | 7/1957 | Orthner et al. | 117—135.5 |
| 2,838,422 | 6/1958 | Orthner et al. | 117—135.5 |
| 2,844,551 | 7/1958 | Orthner et al. | 260—414 |
| 2,932,659 | 4/1960 | Orthner et al. | 260—414 |

ALEXANDER H. BRODMERKEL, *Primary Examiner.*

L. B. HAYES, *Assistant Examiner.*